Patented June 6, 1939

2,161,119

UNITED STATES PATENT OFFICE 2,161,119

RICE CANNING PROCESS

Nicholas C. Coan, Houston, Tex.

No Drawing. Application September 26, 1938,
Serial No. 231,758

2 Claims. (Cl. 99—186)

This invention relates to a process for preparation of rice to the end that the rice can be marketed in cans. The literature contains reference to rice canning processes but, so far as I am aware, none of these has been successful. Those with which I am familiar or have attempted to employ result in the canned product being soggy, starchy and of an unpalatable appearance and taste. It is of course well known that rice can be cooked in the home so that it is light, fluffy, and each grain separates readily from any other. So far as I am aware, none of the previous canning processes have enabled such a product to be produced.

It is in general the broad object of the present invention to provide a process for canning rice which provides cooked rice, when removed by the consumer from the can, in a dry, fluffy state with each grain separating readily from any other grain.

Another object of the present invention is to provide a novel process for canning rice.

A further object of the present invention is to provide a rice canning process which is simple, economical and provides a palatable and marketable product.

In practicing the invention, I take ordinary rice which has been suitably cleaned so that it is free of dirt, chaff and any other foreign matter. This rice is then subjected to the action of boiling water for a period long enough to soften the rice and heat it through to the center of each grain. Preferably this is done by placing the rice in boiling water and retaining it therein for a period of about 15 minutes, or until the rice becomes softened and heated through to its center. I have found it advantageous to replace the boiling water during the softening operation because this facilitates starch removal.

This is conveniently accomplished by running a stream of water into the vessel during the softening operation.

After the rice has been softened and partially cooked, it is washed to remove excess starch and other water soluble material. I have procured the best results by using hot water, 200° F. and above, since I have found that this gives the best results, although cold water can be employed.

The partially softened, wet and washed rice is then dried to reduce the moisture content so that the rice contains approximately one half the total moisture which it is capable of taking up. Usually rice takes up water to about four times its initial weight. I have found that rice, treated as previously disclosed, when subjected to a temperature of 170° F. for about 10 minutes, under such conditions that moisture driven off from the rice is removed from contact therewith, is sufficiently dry. Preferably, the rice is handled in thin layers while being dried so that the rice is substantially uniformly treated.

Upon completion of the drying operation the hot partially dehydrated rice is placed in cans and these cans are immediately completely sealed while hot to ensure the proper reduced pressure therein upon cooling of the cans. The sealed cans are then processed to complete the cooking operation and ensure that the product is sterile. This completes the cooking of the rice. I have found that maintaining the cans at 225° F. for about 40 minutes, for example, suffices to ensure completion of the cooking operation and sterility. Different times and temperatures can be employed. The cans are preferably also removed from the cooker and cooled to stop the cooking operation. Cooling can be accomplished by suitable means provided solely for this or by exposure to the atmosphere if this be cool enough.

The rice product, upon opening one of the cans, will be found to be non-starchy and of a palatable taste and appearance, with each grain easily separating from the others. It is rendered suitable for table use merely by heating, and this can be accomplished by dropping the can, before opening, into hot water for about 5 minutes, or else by opening the can and heating the contents in a double boiler.

I claim:

1. A process for preparation of canned rice which comprises subjecting rice to preliminary cooking in boiling water for about 15 minutes, washing the rice with hot water to remove water soluble materials coating the rice, drying the washed rice in a dry atmosphere for about 10 minutes at about 170° F. to reduce the moisture content thereof to about one half of the total moisture which it is initially capable of taking up, packing the hot partially dried rice in a can, sealing the can and cooking the rice in the sealed can to complete the cooking operation.

2. A process for preparation of canned rice which comprises subjecting rice to preliminary cooking in boiling water for about 15 minutes and substantially continuously replacing the water with hot water during said cooking to wash the rice, drying the cooked and washed rice for about 10 minutes at about 170° F. in a substantially dry atmosphere with the rice spread out in sheet form to reduce the moisture content thereof to about one half of the total moisture which it is initially capable of taking up, packing the hot partially dried rice in a can and sealing the can while hot, and subjecting the sealed can for about 40 minutes to a temperature of about 225° F. to complete the cooking operation.

NICHOLAS C. COAN.